(12) United States Patent
Martindale (10) Patent No.: US 9,855,883 B2
(45) Date of Patent: Jan. 2, 2018

(54) PNEUMATIC SYSTEMS AND DEVICES FOR SECURING A CONTAINER TO A VEHICLE CHASSIS

(71) Applicant: Wastequip, LLC, Charlotte, NC (US)

(72) Inventor: Nathan L. Martindale, Star City, IN (US)

(73) Assignee: Wastequip, LLC, Charlotte, NC (US)

( * ) Notice: Subject to any disclaimer, the term of this patent is extended or adjusted under 35 U.S.C. 154(b) by 22 days.

(21) Appl. No.: 14/585,384

(22) Filed: Dec. 30, 2014

(65) Prior Publication Data

US 2016/0185274 A1 Jun. 30, 2016

(51) Int. Cl.
*B60P 7/13* (2006.01)

(52) U.S. Cl.
CPC ...................... *B60P 7/13* (2013.01)

(58) Field of Classification Search
CPC .......... E05B 81/10; E05B 81/16; E05B 85/24; E05B 51/00; E05B 51/02; E05B 57/00; B60P 7/13
USPC ........................................................ 410/80
See application file for complete search history.

(56) References Cited

U.S. PATENT DOCUMENTS

| | | | |
|---|---|---|---|
| 3,305,217 A * | 2/1967 | Wijgergangs | B66F 3/35 254/93 HP |
| 3,486,782 A * | 12/1969 | Zanussi | A47L 15/4259 134/57 DL |
| 4,428,569 A * | 1/1984 | Takei | F16F 9/04 267/140.11 |
| 4,603,908 A * | 8/1986 | Weaver | B60P 1/02 298/17 R |
| 6,053,692 A | 4/2000 | Mason et al. | |
| 6,068,440 A * | 5/2000 | Lang | B60P 7/13 414/480 |
| 6,106,032 A * | 8/2000 | Och | E05B 51/02 292/195 |
| 6,695,553 B1 | 2/2004 | Galbreath et al. | |
| 7,736,106 B2 | 6/2010 | Talbot et al. | |
| 7,780,383 B2 | 8/2010 | Brescia | |
| 2003/0132074 A1 * | 7/2003 | Robbins | B60G 17/033 188/322.15 |
| 2013/0089397 A1 | 4/2013 | Downing et al. | |

* cited by examiner

*Primary Examiner* — H Gutman
(74) *Attorney, Agent, or Firm* — Nelson Mullins Riley & Scarborough LLP (57) ABSTRACT

A pneumatic locking system configured to secure a container to a vehicle chassis. The locking system can include a hook pivotable between an unlocked orientation and a locked orientation relative to the chassis and an inflatable bellows intermediate the hook and the chassis, wherein inflation of the inflatable bellows is configured to pivot the hook from the unlocked orientation to the locked orientation. The locking system can further include an air line system fluidically coupled to the inflatable bellows and an air supply system. The air line system can include a valve controllable by a switch, wherein actuation of the valve is configured to supply air from the air supply system to the inflatable bellows and pivot the hook to the locked orientation.

10 Claims, 11 Drawing Sheets

PNEUMATIC SYSTEMS AND DEVICES FOR SECURING A CONTAINER TO A VEHICLE CHASSIS

FIELD

The present disclosure relates to pneumatic systems and devices for securing a container to a vehicle chassis and methods for assembling and using the same.

SUMMARY

In at least one form, a pneumatic locking system for securing a container to a chassis includes a frame, a first hook, a second hook, a first inflatable bellows intermediate the first hook and the frame, and a second inflatable bellows intermediate the second hook and the frame. The first hook is pivotable between a first unlocked orientation and a first locked orientation relative to the frame. The second hook is pivotable between a second unlocked orientation and a second locked orientation relative to the frame. Inflation of the first inflatable bellows is configured to pivot the first hook from the first unlocked orientation to the first locked orientation, and inflation of the second inflatable bellows is configured to pivot the second hook from the second unlocked orientation to the second locked orientation.

In at least one form, the pneumatic locking system further includes a fluid line, a first fitting fluidically coupled to the fluid line, the first inflatable bellows, and an outlet, and a second fitting fluidically coupled to the outlet and the second inflatable bellows. In at least one form, the air supply of the chassis is fluidically coupled to the fluid line.

In at least one form, the first hook is configured to move toward a vertical axis when the first hook moves from the first unlocked orientation to the first locked orientation, and the center of mass of the first hook is on a first side of the vertical axis when the first hook is in the first unlocked orientation and the first locked orientation.

In at least one form, the pneumatic locking system further includes a shaft secured to the frame, wherein the first hook and the second hook are configured to pivot independently about the shaft.

In at least one form, the frame further includes a first cutout structured and dimensioned to receive a portion of the first hook and a second cutout structured and dimensioned to receive a portion of the second hook.

In at least one form, the first hook and the second hook each include an L-shaped hook.

In at least one form, the first inflatable bellows and the second inflatable bellows are comprised of rubber.

In at least one form, an air lock system includes a first lock, a second lock, and an air line system. The first lock includes a first frame mountable to a chassis, a first hook pivotable between a first unlocked orientation and a first locked orientation relative to the first frame, and a first inflation chamber intermediate the first hook and the first frame. The first hook is configured to engage a container that is loaded onto the chassis when the first hook is in the first locked orientation, and inflation of the first inflation chamber is configured to pivot the first hook from the first unlocked orientation to the first locked orientation. The second lock includes a second frame mountable to the chassis, a second hook pivotable between a second unlocked orientation and a second locked orientation relative to the second frame, and a second inflation chamber intermediate the second hook and the second frame. The second hook is configured to engage the container that is loaded onto the chassis when the second hook is in the second locked orientation, and inflation of the second inflation chamber is configured to pivot the second hook from the second unlocked orientation to the second locked orientation. The air line system includes a primary air line comprising a junction, a first supplemental air line extending from the junction to the first inflation chamber, and a second supplemental air line extending from the junction to the second inflation chamber.

In at least one form, the air line system is fluidically coupled to an air supply on the chassis, and wherein the air line system further comprises a safety valve intermediate the air supply and the junction. In at least one form, the air line system further includes an air flow regulator intermediate the safety valve and the junction. In at least one form, the air line system further includes a secondary valve intermediate the safety valve and the junction.

In at least one form, the air lock system further includes a solenoid valve operably configured to supply air from the air supply to the air line system. In at least one system, the air lock system further includes a power switch operably coupled to the solenoid valve.

In at least one form, the first lock further includes a third hook pivotable between a third unlocked orientation and a third locked orientation relative to the first frame and a third inflation chamber intermediate the third hook and the first frame. The third hook is configured to engage the container that is loaded onto the chassis when the third hook is in the third locked orientation, and inflation of the third inflation chamber is configured to pivot the third hook from the third unlocked orientation to the third locked orientation. The first supplemental air line further comprises a first air line extension extending between the first inflation chamber and the third inflation chamber. In at least one form, the second lock further includes a fourth hook pivotable between a fourth unlocked orientation and a fourth locked orientation relative to the second frame and a fourth inflation chamber intermediate the fourth hook and the second frame. The fourth hook is configured to engage the container that is loaded onto the chassis when the fourth hook is in the fourth locked orientation, and inflation of the fourth inflation chamber is configured to pivot the fourth hook from the fourth unlocked orientation to the fourth locked orientation. The second supplemental air line further includes a second air line extension extending between the second inflation chamber and the fourth inflation chamber.

In at least one form, a vehicle chassis configured to support a container includes an air supply system and a locking system for securing the container to the chassis. The locking system includes a hook pivotable between an unlocked orientation and a locked orientation relative to the chassis, an inflatable bellows intermediate the hook and the chassis, and an air line system fluidically coupled to the inflatable bellows and the air supply system. Inflation of the inflatable bellows is configured to pivot the hook from the unlocked orientation to the locked orientation, and the air line system includes a valve controllable by a switch, and wherein actuation of the valve is configured to supply air from the air supply system to the inflatable bellows and pivot the hook to the locked orientation.

In at least one form, the valve includes a solenoid valve.

In at least one form, the locking system further includes a second hook pivotable between a second unlocked orientation and a second locked orientation relative to the chassis, and a second inflatable bellows intermediate the second hook and the chassis, wherein inflation of the second inflatable bellows is configured to pivot the second hook from the unlocked orientation to the locked orientation, and wherein the an air line system is fluidically coupled to the second inflatable bellows. In at least one form, the hook is positioned on a first side of the chassis, and the second hook is positioned on a second side of the chassis.

The foregoing discussion is intended only to illustrate various aspects of certain embodiments disclosed in the present disclosure and should not be taken as a disavowal of claim scope.

BRIEF DESCRIPTION OF THE DRAWINGS

Various features of the embodiments described herein are set forth with particularity in the appended claims. The various embodiments, however, both as to organization and methods of operation, together with the advantages thereof, may be understood in accordance with the following description taken in conjunction with the accompanying drawings as follows:

The exemplifications set out herein illustrate various embodiments, in one form, and such exemplifications are not to be construed as limiting the scope of the appended claims in any manner.

DETAILED DESCRIPTION

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims. For example, the features illustrated or described in connection with one exemplary embodiment may be combined with the features of other embodiments. Such modifications and variations are intended to be included within the scope of the present disclosure.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

Figure 1:
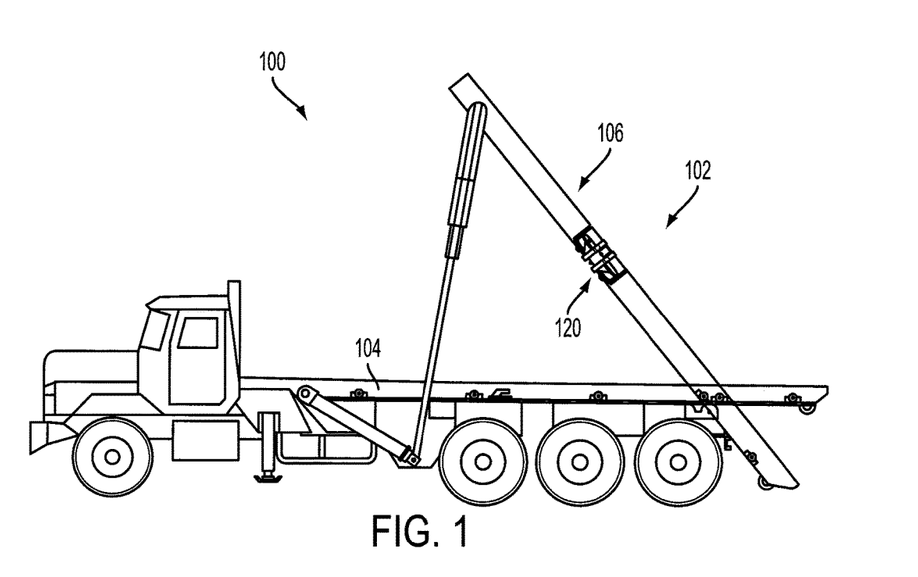
FIG. 1 is an elevational view of a vehicle including a chassis and a hoist apparatus, and further depicting a locking device mounted to the hoist apparatus, wherein the locking device is shown in an unlocked orientation, according to various embodiments of the present disclosure.
Figure 2:
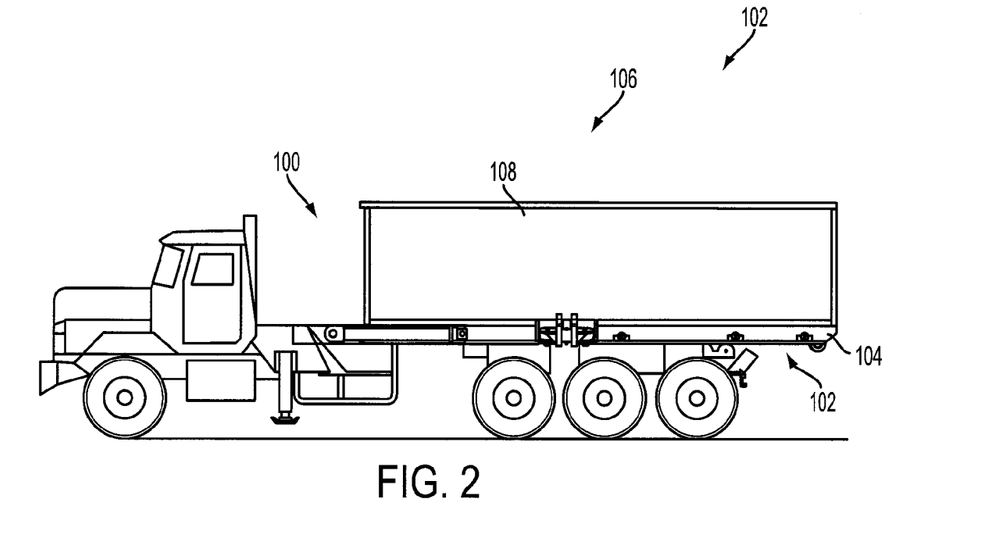
FIG. 2 is an elevational view of the vehicle and the chassis of FIG. 1, depicting a container mounted on the hoist apparatus, and further depicting the locking device of FIG. 1 in a locked orientation, according to various embodiments of the present disclosure.
Figure 3:
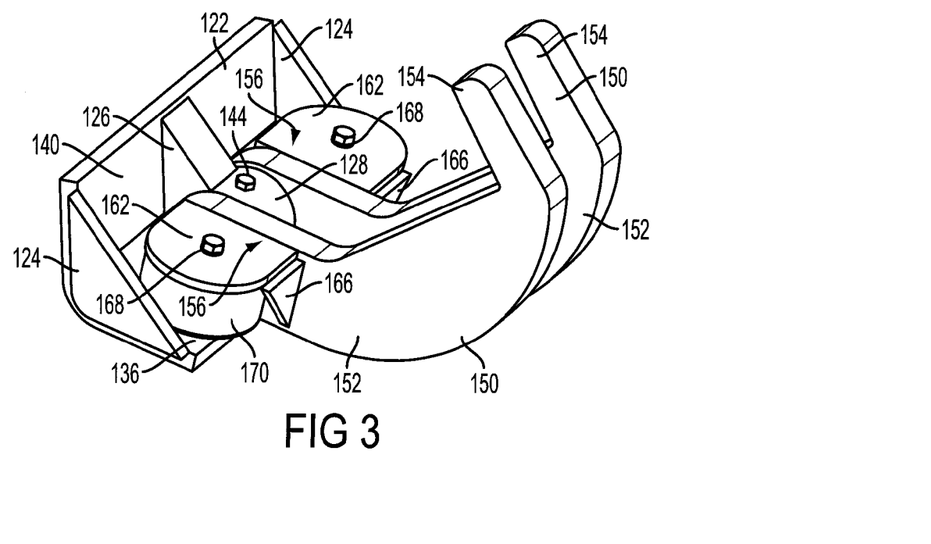
FIG. 3 is a perspective view of the locking device of FIG. 1, depicting the locking device in the unlocked orientation, according to various embodiments of the present disclosure.
Figure 4:
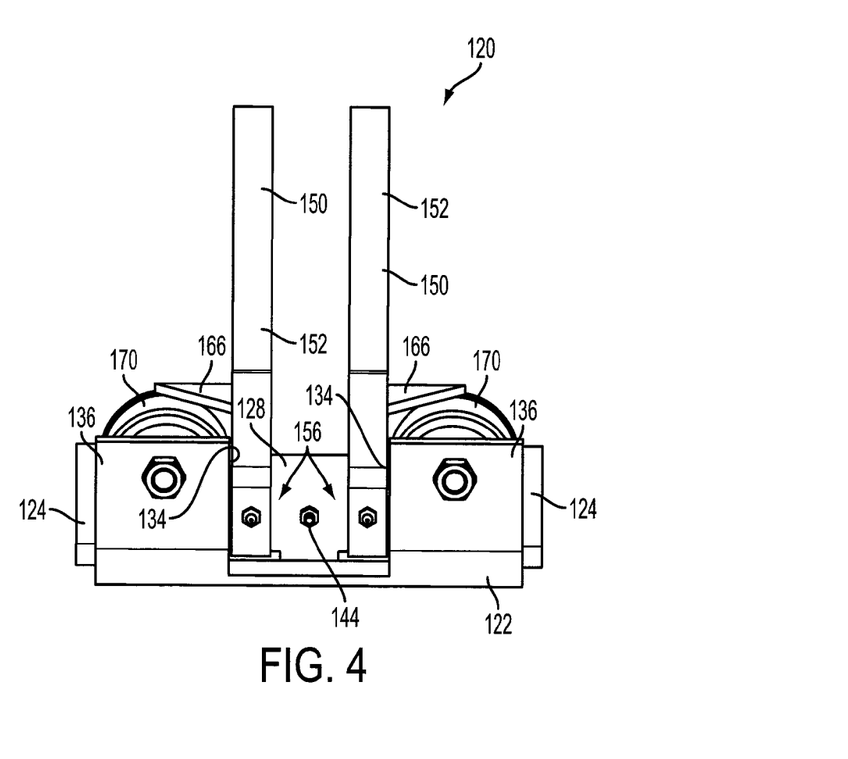
FIG. 4 is a plan view of the locking device of FIG. 3, depicting the locking device in the unlocked orientation, according to various embodiments of the present disclosure.

A vehicle 100 is depicted in FIGS. 1 and 2. The vehicle 100 includes a chassis 102 and a hoist apparatus on the chassis 102. The hoist apparatus includes a stationary frame 104 and a hoist frame 106 that is configured to pivot relative to the stationary frame 104 during loading and unloading operations. For example, the hoist frame 106 can pivot to the orientation depicted in FIG. 1 to facilitate loading and unloading of a container 108 (FIG. 2) onto the chassis 102. In certain instances, the hoist apparatus can include a hydraulic actuator that is configured to lift and pivot the hoist frame 106 relative to the stationary frame 104. During transit, the hoist frame 106 can resume a horizontal orientation (FIG. 2). For example, the hydraulic actuator can lower the hoist frame 106 relative to the stationary frame 104 to assume the horizontal orientation. A hoist apparatus is described in U.S. patent application Ser. No. 12/576,776, entitled HOIST APPARATUS, filed on Oct. 10, 2012, now U.S. Patent Application Publication No. 2013/0089397, which is hereby incorporated by reference herein in its entirety. In certain embodiments, the chassis 102 can be integral to the vehicle 100. In other instances, the chassis 102 can be separate from the vehicle 100, and can be configured to be coupled and/or towed by the vehicle 100, for example.

It is desirable to secure the container 108 (FIG. 2) to the chassis 102 during transit. Referring still to FIGS. 1 and 2, a pneumatic locking device 120 is mounted to the left side of the hoist frame 106. Another locking device 120 can be mounted to the right side of the hoist frame 106 of the chassis 102. In other embodiments, more than one locking device 120 can be mounted to at least one side of the hoist frame 106 and/or locking device(s) 120 can be mounted to additional sides of the hoist frame 106.

The locking device 120 can be secured to the hoist frame 106. For example, the locking device 120 can be welded to the hoist frame 106. A welded attachment can secure the locking device 120 relative to the hoist frame 106 without requiring additionally fastening apertures into the hoist frame 106, which could weaken the hoist frame 106, for example. Additionally or alternatively, the locking device 120 can be bonded and/or adhered to the hoist frame 106. In other instances, the locking device 120 and/or a portion thereof can be integrally formed with the hoist frame 106. For example, the mounting bracket and/or frame 122 (FIGS. 3-7, 10 and 11) of the locking device 120 can be integrally formed with the hoist frame 106. In certain instances, the locking device 120 can be fastened to the hoist frame 106 with a plurality of fasteners, such as bolt and/or screw assemblies, for example.

The locking device 120 can be configured to move between an unlocked orientation and a locked orientation. In the unlocked orientation (FIG. 1), the locking device 120 can be disengaged from the container 108. When the container 108 has been loaded onto the chassis 102, the locking devices 120 can be actuated to move into a locked orientation (FIG. 2). In the locked position, the locking device 120 can engage the container 108 to secure the container 108 relative to the chassis 102. For example, the locking device 120 can engage, hook, and/or catch a portion of the container 108, such as a lower support bar, for example. In certain instances, the locking device 120 can be actuated and moved to engage the container 108 when the vehicle 100 and engine thereof has been started, e.g., during transit mode. For example, starting the engine of the vehicle 100 can initiate transit mode, which can actuate the locking device 120, as described herein.

Referring primarily now to FIGS. 3-7, 10, and 11, the locking device 120 for securing the container 108 (FIG. 2) to the chassis 102 (FIGS. 1 and 2) can include a frame 122, at least one hook 150 pivotably mounted to the frame 122, and at least one air chamber 170 positioned between the frame 122 and each hook 150 of the locking device 120. Inflation and deflation of the air chamber 170 adjacent to the hook 150 can cause the hook 150 to pivot relative to the frame 122. Moreover, the hook 150 can be configured to pivot between an unlocked orientation (FIGS. 3-6), in which the hook 150 is disengaged with the container 108 (FIG. 1), and a locked orientation (FIG. 7), in which the hook 150 is engaged with the container 108 (FIG. 2).

Referring primarily to FIGS. 3-7, 10 and 11, the locking device 120 includes the frame 122, a plurality of hooks 150, and a plurality of air chambers 170. The movable and/or pivotable components of the locking device 120, e.g., the hooks 150 and the air chambers 170, can be secured to the frame 122, which can support the movable and/or pivotable components. The frame 122 comprises a L-bracket, which includes base portions 136 and an upright portion 140, for example. The frame 122 can further include a pair of side walls 124, which can be positioned on opposing ends of the L-bracket.

Figure 10:
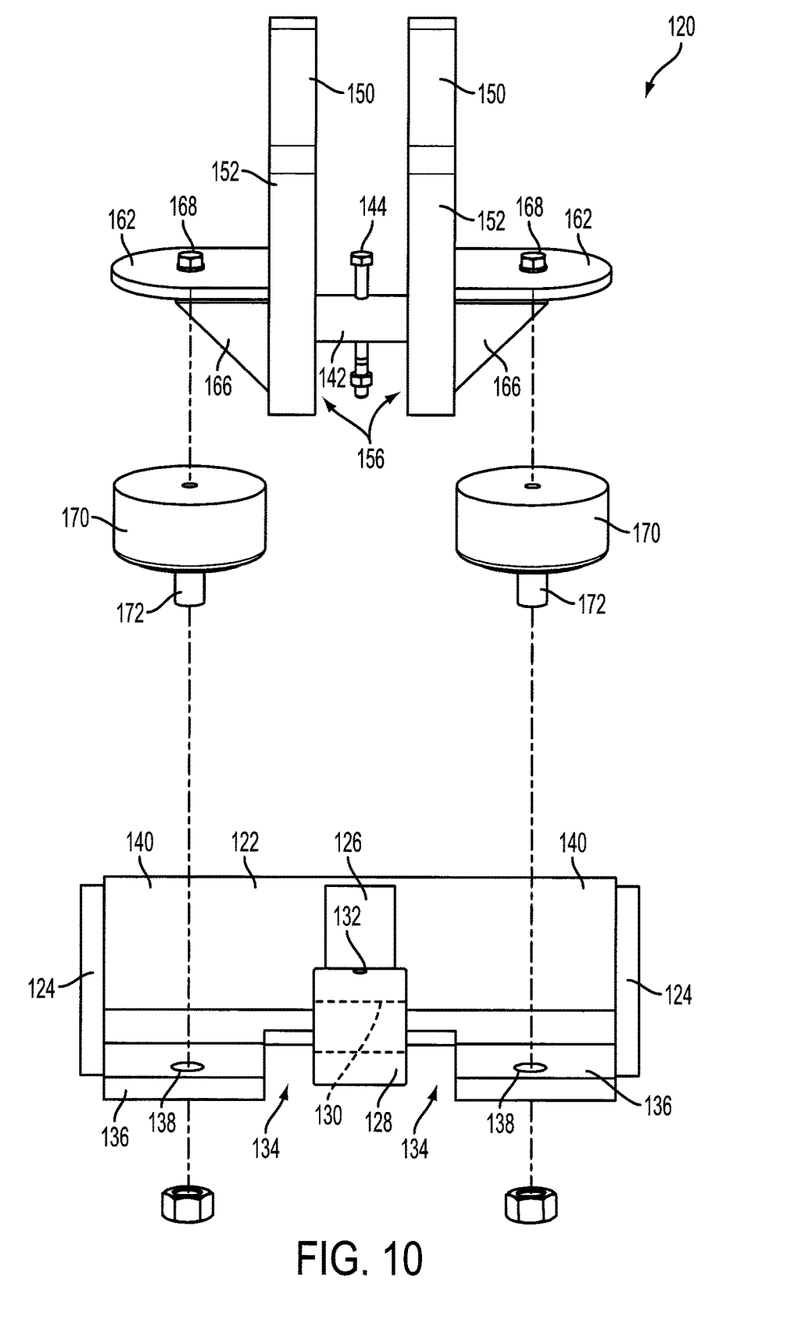
FIG. 10 is an exploded elevational view of the locking device of FIG. 3, according to various embodiments of the present disclosure.

The frame 122 is configured to support the air chambers 170 and/or the hooks 150. For example, the air chambers 170 depicted in FIGS. 3-7 rest on the base portions 136 of the frame 122. Referring primarily to FIG. 10, each base portion 136 includes an air chamber aperture 138. The apertures 138 are structured and dimensioned to receive a port 172 to the air chamber 170 such that air can be supplied to the air chambers 170 through the apertures 138 in the base portions 136.

Figure 11:
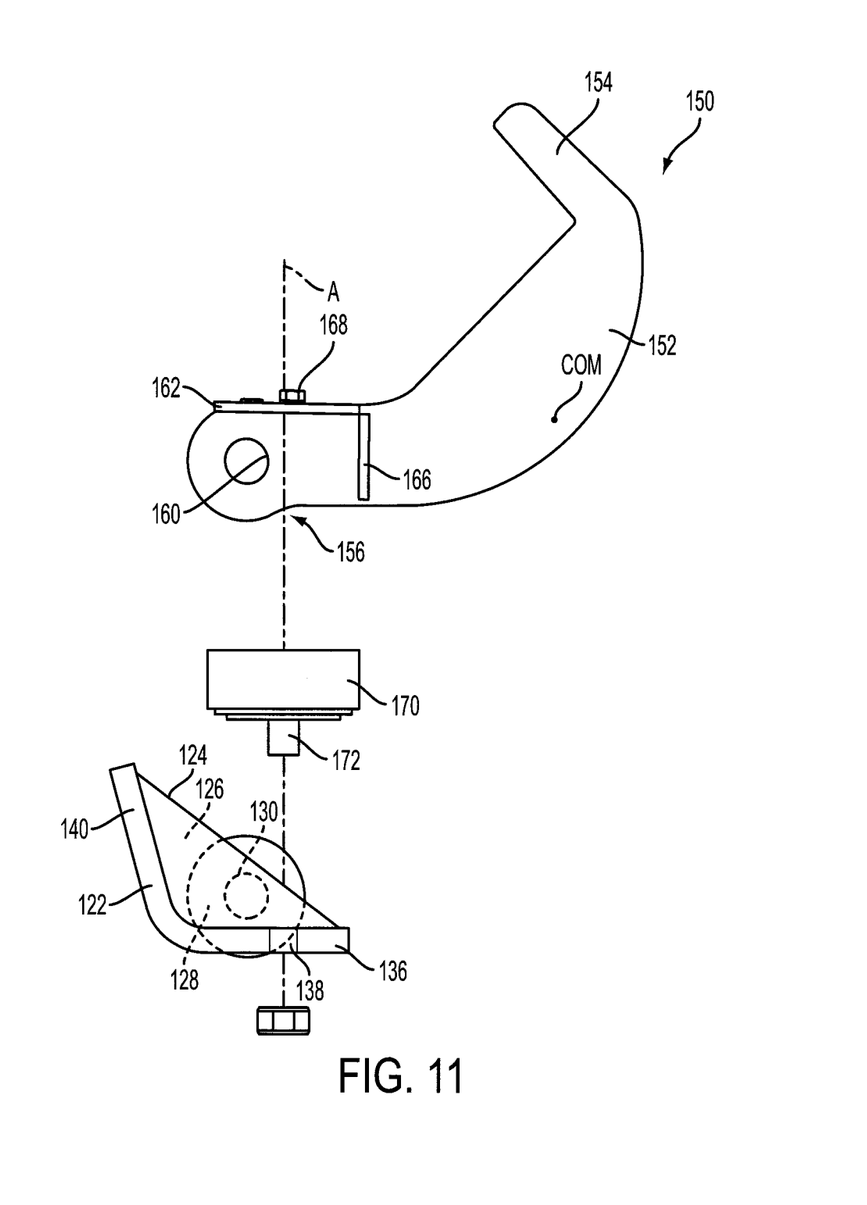
FIG. 11 is another exploded elevational view of the locking device of FIG. 3, according to various embodiments of the present disclosure.

The frame 122 further includes a socket 128, which is structured and dimensioned to receive a shaft 142 (FIGS. 10 and 11). For example, an aperture 130 (FIGS. 10 and 11) can be defined through the socket 128, and the shaft 142 can be positionable through the aperture 130. As described herein, the hooks 150 can be rotatably mounted on the shaft 142 such that the hooks 150 are secured to the frame 122 via the socket 128 and shaft 142 engagement. The socket 128 further includes a through-hole 132, which is structured and dimensioned to receive a fastener 144, such as a bolt, for example. The fastener 144 can also engage the shaft 142 (see FIG. 10) and/or can be integrally formed with the shaft 142. When the fastener 144 is fixed relative to the shaft and is positioned within the through-hole 132 (FIG. 10) in the socket 128, rotation of the shaft 142 relative to the socket 128 can be prevented. The depicted frame 122 also includes a support gusset 126, which extends between the upright portion 140 of the frame 122 and the socket 128. The gusset 126 can be configured to resist deformation of the frame 122.

A pair of cutouts 134 (FIGS. 4 and 10) can be defined in the frame 122. For example, a cutout 134 can be defined between each base portion 136 and the centrally-positioned socket 128. Each cutout 134 can be dimensioned and structured to accommodate at least a portion of one of the hooks 150. In various instances, the hooks 150 can be configured to pivot and/or swing within the cutouts 134 as the hooks 150 move between the unlocked orientation and the locked orientation.

Figure 8:
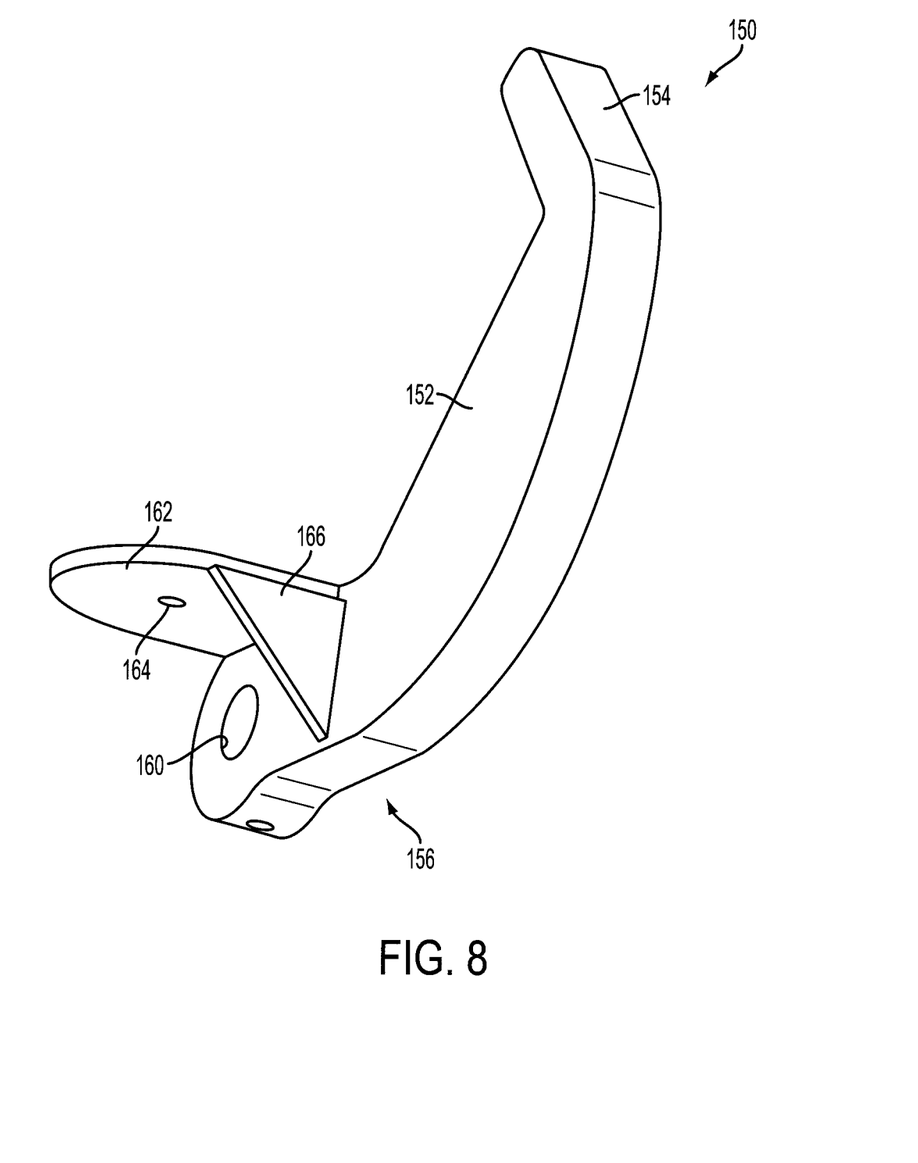
FIG. 8 is a perspective view of a hook of the locking device of FIG. 3, according to various embodiments of the present disclosure.
Figure 9:
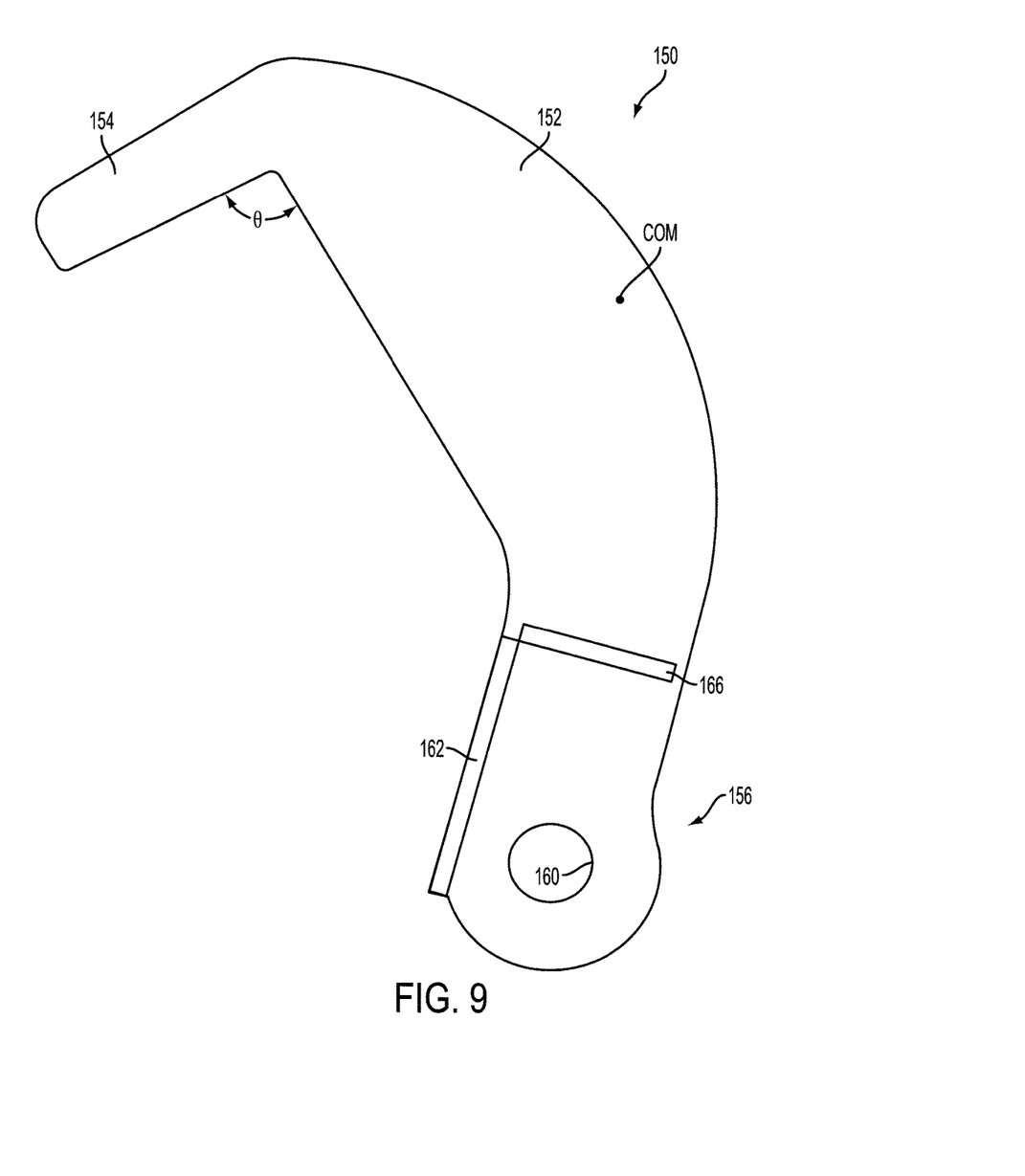
FIG. 9 is an elevational view of the hook of FIG. 8, according to various embodiments of the present disclosure.

Referring primarily to FIGS. 8 and 9, one of the hooks 150 from the locking device 120 is depicted. The depicted hook 150 includes a hook body 152 and an extension or catch 154 extending from a first end of the body 152. The catch 154 is oriented at an angle θ (FIG. 9) relative to the body 152. In various instances, the angle θ can be 90 degrees, or substantially 90 degrees, such that the body 152 and the catch 154 form an L-shaped hook 150. The hook 150 also includes a mounting portion 156 at a second end of the body 152. The second end of the body is opposite to the first end.

The mounting portion 156 of each hook 150 is rotatably mounted to the shaft 142. In various instances, for each hook 150, an aperture 160 can be defined through the mounting portion 156, and the aperture 160 can be dimensioned and structured to receive the shaft 142 therein. In such instances, the hook 150 is rotatably mounted to the shaft 142 via the aperture 160. For example, the hook 150 can be configured to rotate on the shaft 142. Referring again to FIG. 10, the hook 150 can be positioned on the shaft 142 between the socket 128 and one of the base portions 136. The placement of the socket 128 and the base portion 136 on either side of the hook 150 can prevent and/or restrain translation of the hook 150 relative to and/or along the shaft 142 while permitting rotation of the hook 150 about the shaft 142.

The hook 150 further includes a plate 162 that extends from the body 152. A through-hole 164 extends through the plate 162. In various instances, a fastener 168 is positioned within the through-hole 164, and the fastener 168 is configured to secure the air chamber 170 relative to the hook 150. The hook 150 also includes support gusset 166 extending from the body 152. The support gusset 166 can confine the air chamber 170 and/or support the plate 162 relative to the body 152.

Each air chamber 170 in the locking device 120 can be positioned between one of the hooks 150 and the frame 122. For example, each air chamber 170 can be positioned between the plate 162 of the hook 150 and one of the base portions 136 of the frame 122. Moreover, the air chambers 170 can be configured to expand and contract. For example, the air chambers 170 can be comprised of a flexible and/or elastic material, such as rubber. An inflow of air into the air chambers 170 can cause the air chambers 170 to expand and an outflow of air from the air chambers 170 can cause the air chambers 170 to contract.

Expansion and contraction of the air chambers 170 can change the distance between the plate 162 and the base portion 136. For example, inflation of the air chamber 170 can push the plate 162 farther away from the base portion 136. Because the hook 150 is restrained to rotate relative to the frame 122 by the shaft 142 and mounting portion 156 engagement, the plate 162 can pivot away from the base portion 136 when the air chamber 170 therebetween is inflated. Moreover, when the air chamber 170 is deflated, the plate 162 can be drawn toward the base portion 136. For example, the plate 162 can rotate back toward the base portion 136.

Figure 6:
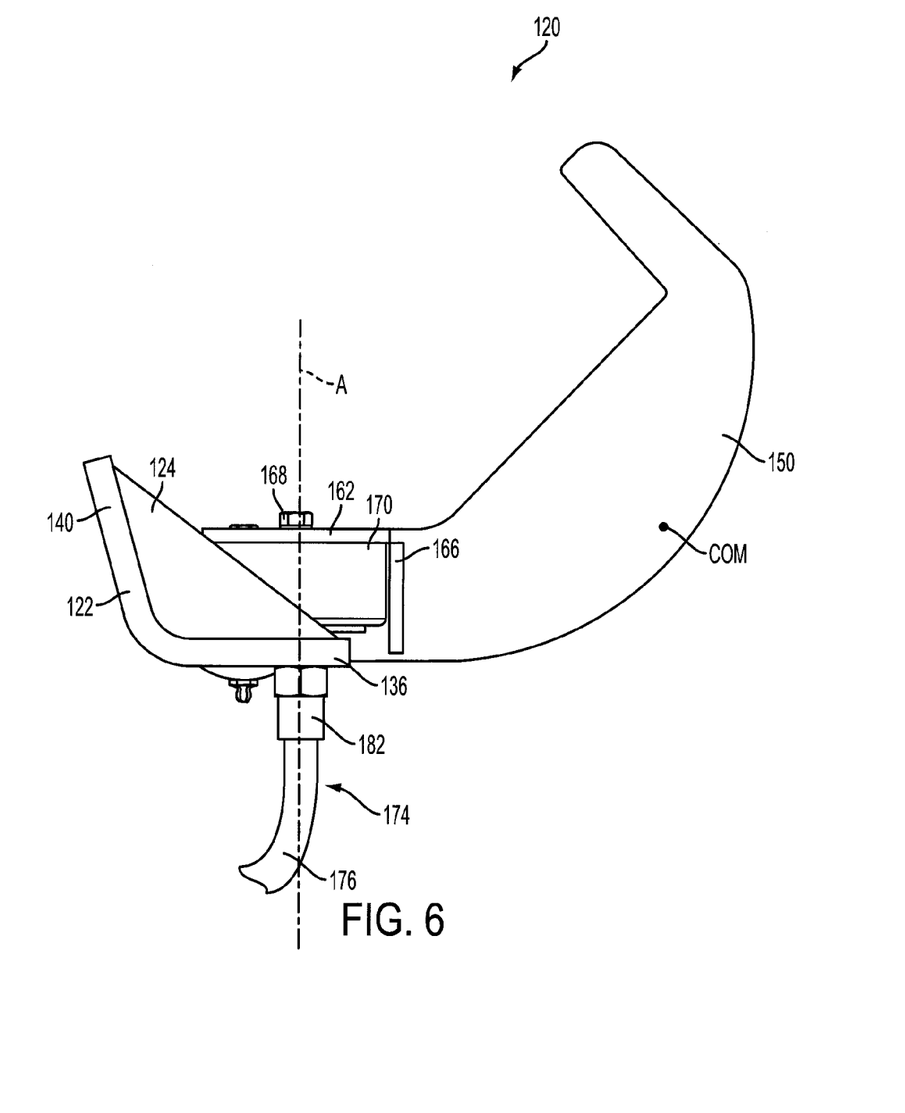
FIG. 6 is another elevational view of the locking device of FIG. 3, depicting the locking device in the unlocked orientation, and further depicting the portion of the air line system of FIG. 5 coupled to the locking device, according to various embodiments of the present disclosure.
Figure 7:
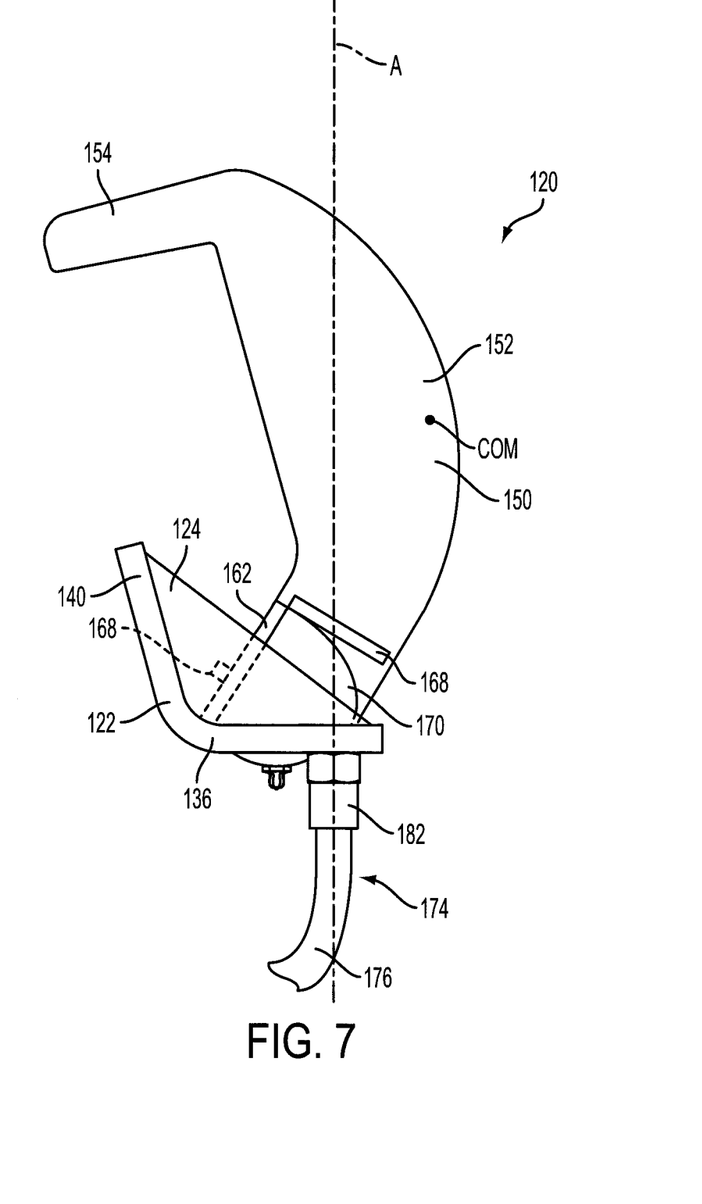
FIG. 7 is another elevational view of the locking device of FIG. 3, depicting the locking device in the locked orientation, and further depicting the portion of the air line system of FIG. 5 coupled to the locking device, according to various embodiments of the present disclosure.

Referring primarily to FIGS. 6 and 7, an axis A can be defined perpendicular to the base portions 136 of the frame 122. When the hook 150 is in the unlocked orientation (FIG. 6), the axis A can be oriented perpendicular to the plate 162 of each hook 150. Moreover, when the hook 150 is moved from the unlocked orientation to the locked orientation (FIG. 7), the hook 150 can rotate toward and/or beyond the axis A. Each hook 150 can include a center of mass (COM), which is depicted in FIGS. 6, 7, and 9. The hooks 150 can be designed such that the center of mass of each hook 150 is on a first side of the axis A when the hook 150 is in the unlocked orientation and when the hook 150 is in the locked orientation. In various instances, the axis A can define a vertical axis when the frame 122 is mounted to the hoist frame 106 (FIGS. 1 and 2) and the hoist frame 106 has been lowered to the horizontal orientation (FIG. 2) for transit. In such instances, a gravitational force can pull the hook 150 from the locked oriented toward the unlocked orientation. Accordingly, when the air chamber 170 is deflated, gravity can pull the hook 150 back to the unlocked orientation.

In at least one embodiment, various elements of the locking device 120 can be comprised of metal. For example, the frame 122 and the hook 150 can be comprised of metal. In certain instances, the frame 122 and the hook 150 can be comprised of a steel alloy, such as A36 steel, for example.

Figure 5:
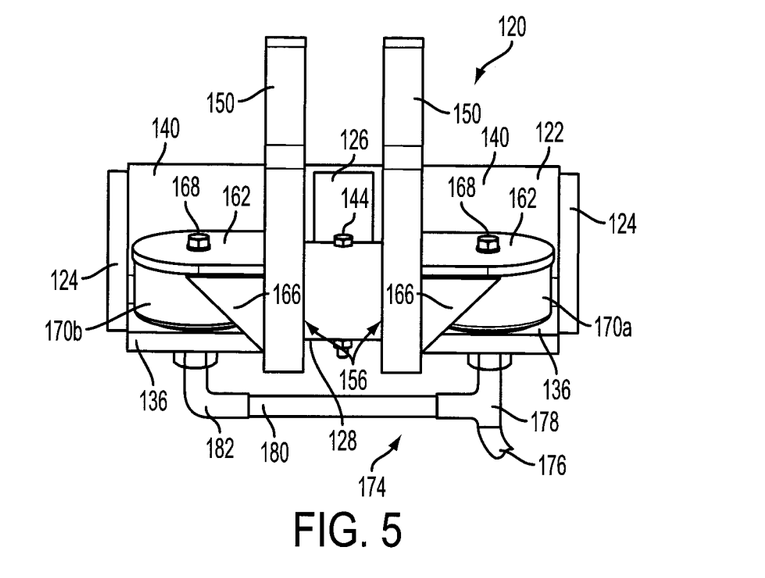
FIG. 5 is an elevational view of the locking device of FIG. 3, depicting the locking device in the unlocked orientation, and further depicting a portion of an air line system coupled to the locking device, according to various embodiments of the present disclosure.

The locking device 120 can be fluidically coupled to an air supply by an air line system. The air line system can operably supply air to the air chambers 170 of the lock from the air supply. A portion of an air line system 174 is depicted in FIGS. 5-7. The air line system 174 includes a supplemental air line 176 extending to the locking device 120. In various instances, a locking system can include multiple locking devices 120, and each locking device 120 can be coupled to a supplemental air line 176. As described herein, the supplemental air line 176 can be fluidically coupled to an air supply.

Referring primarily to FIG. 5, the supplemental air line 176 extends to a first fitting 178, which is positioned adjacent to the first air chamber 170*a* of the locking device 120. The first fitting 178 can include an inlet fluidically coupled to the supplemental air line 176, a first outlet fluidically coupled to the port 172 (FIG. 11) of the first air chamber 170*a*, and a second outlet fluidically coupled to an air line extension 180. For example, the first fitting 178 can form a T-shaped fitting having three air passageways. The air line extension 180 can extend from the first fitting 178 to a second fitting 182, which is positioned adjacent to the second air chamber 170*b* of the locking device. The second fitting 178 can include an inlet fluidically coupled to the air line extension 180 and an outlet fluidically coupled to the port 172 (FIG. 11) of the second air chamber 170*b*. The reader will appreciate that the terms "inlet" and "outlet" as used above are relative terms. During inflation of the air chambers 170*a*, 170*b*, air can flow into the fitting 178, 182 through an "inlet" and can flow out of the fitting 178, 182 though an "outlet." However, the flow of air can be reversed, such as during deflation of the air chambers 170*a*, 170*b*, such that air flows into the fittings 178, 182 through "outlets" and flows out of the fittings 178, 182 though "inlets".

The air line system 174 includes an air line to each air chamber 170. Moreover, each hook 150 can be autonomously and independently actuatable and/or pivotable. For example, inflation of an air chamber 170 can affect pivoting of the corresponding hook 150. Additionally, the hooks 150 on each locking device 120 can be configured to pivot independently. In other words, the hooks 150 of each locking device are configured to rotate on the shaft 142, however, the hooks 150 are not linked to rotate synchronously. As a result, as air flows into each air chamber 170 from the air line coupled thereto, each hook 150 moves from the unlocked configured to the locked configuration independently. If the rotational path of one of the hooks 150 is blocked and/or obstructed, the other hook 150 can continue to rotate to the locked configuration.

In various instances, a locking system for securing the container 108 (FIG. 2) to the chassis 102 of the vehicle 100 (FIGS. 1 and 2) can include a plurality of locking devices 120. In certain instances, the locking system can include a pair of locking devices 120, and a locking device 120 can be mounted to both lateral sides of the hoist frame 106 (FIGS. 1 and 2). In certain instances, the chassis 102 and/or the vehicle 100 can include an onboard air supply and the locking system can be coupled to such an air supply. For example, the chassis 102 can include an air supply that is configured to control the suspensions and/or brakes. In certain instances, the locking system can be fluidically coupled to such an air supply. The air supply can be configured to supply air to the air chambers 170 of each locking device 120, which can control inflation of the air chambers 170 and thus pivoting of the hooks 170 between the unlocked configurations and the locked configurations, as described herein.

Figure 12:
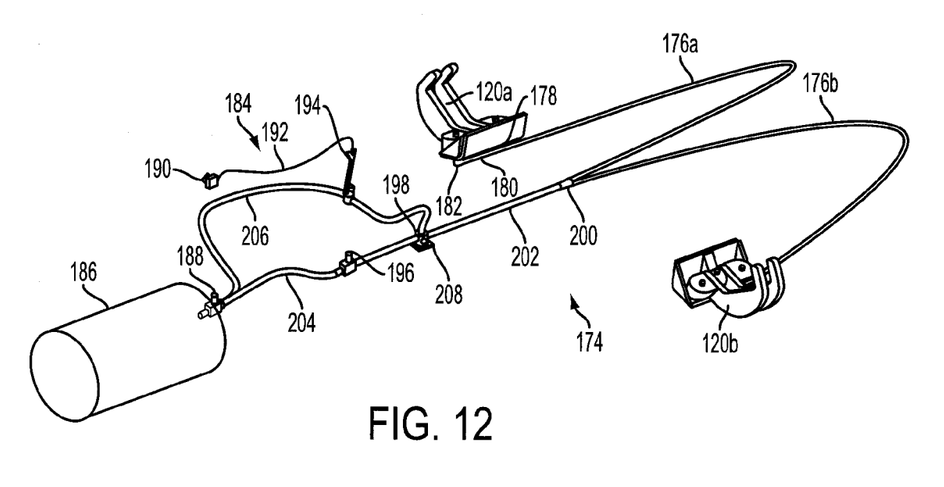
FIG. 12 is a schematic depicting an air line system and control system for actuating a locking system including the locking device of FIG. 3, according to various embodiments of the present disclosure.

The air line system 174 can be positioned intermediate the locking device 120 and the air supply. In various instances, the air line system 174 can regulate the air flow into and/or out of the locking system. The air line system 174 is depicted in FIG. 12. In the depicted embodiment, the air line system 174 is coupled to an air supply 186. The air supply 186 can be positioned on the chassis 102, and can supply air to other pneumatic systems on the chassis 102, such as the pneumatic brakes and/or a suspension system, for example.

A valve 188 can be positioned intermediate the air supply 186 and the air line system 174. The valve 188 can comprise a safety valve, which can protect the air supply 186. For example, if the air line system 174 becomes compromised, the safety valve 188 can protect the air supply 186 for the other pneumatic systems on the chassis 102. In other words, the valve 188 can prevent bleeding of air from the air supply 186. In various instances, actuation of the valve 188 can be controlled by the pressure in the system. The valve 188 can open when a predefined pressure is achieved, and can close when the pressure drops below the predefined pressure. For example, if the pressure in the air line system 174 drops below the predefined pressure, such as the result of a leak and/or break in the system 174, the valve 188 can close. In certain embodiments, the valve 188 can comprise a tractor protection valve.

An inlet line 206 and an outlet line 204 extend from the safety valve 188. The inlet line 206 can supply air to a valve 194. The valve 194 can comprise a solenoid valve, for example, which can be controlled by a switch 190. Referring to FIG. 12, the switch 190 can be in communication with the solenoid valve 194 along the signal conduit 192. In various instances, the solenoid valve 194 and the switch 190 can comprise elements of a control system 184 of the locking system. The switch 190 can be positioned in the vehicle 100, such as in the cab of a truck, for example. In such instances, air flow to the locking system can be controlled remotely. Actuation of the switch 190 can open the solenoid valve 194, which can provide a pathway from the air supply 186, through the inlet conduit 206, and toward the locking devices 120.

In various instances, the switch 190 can comprise a power takeoff (PTO) switch. The PTO switch 190 can power the locking system when the switch 190 is in a first position and can power another system or systems on the chassis 102 when the switch 190 is in a second position. For example, the PTO switch 190 can selectively actuate one of the locking system or the hoist system (FIGS. 1 and 2). In such instances, during transit of the vehicle 100 with the container 108 (FIG. 2) loaded thereon, the locking system can be actuated and the hoist system can be inactive. In addition to the locking system, the pneumatic brakes and/or suspension system can be actuated when the vehicle is in transit mode. For example, when the engine of the vehicle 100 is started and the PTO switch 190 is in the first position, the pneumatic locking system, brakes, and suspension system can be actuated. Moreover, during loading and/or unloading of the container 108 on the vehicle 100 via the hoist system, the hoist system can be actuated and the locking system can be inactive. For example, when the engine of the vehicle is turned off and the PTO switch 190 is in the second position, the hoist system can be actuated and the pneumatic locking system, brakes, and suspension system can be inactive.

In various instances, the air line system 174 can also include a valve 198 and an air regulator 196 arranged in series along the outlet line 204. In various instances, the valve 198 can comprise a relief valve, such as a pilot valve, for example. The pilot valve 198 is fluidically coupled to the inlet line 206, the outlet line 204, and a primary line 202 that extends to the locking devices 120a, 120b. The pilot valve 198 can comprise a check valve, which operably permits one-way air flow from the inlet line 206 to the primary line 202 and one-way air flow from the primary line 202 to the outlet line 206. A change in pressure in the inlet line 206 can actuate the pilot valve 198. For example, when the PTO switch 190 has actuated the solenoid valve 194 to permit air flow from the air supply 186 and through the inlet line 206, the pilot valve 198 can permit air flow from the inlet line 206 into the primary line 202. Moreover, when the PTO switch 190 deactivates the solenoid valve 194, the pressure at the pilot valve 198 can change. As a result, the pilot valve 198 can then permit air flow from the primary line 202 into the outlet line 204. In various instances, the pilot valve 198 can also include at least one muffler 208.

In various instances, the pilot valve 198 and the air regulator 196 can be configured to moderate the air flow in the air line system 174. For example, the pilot valve 198 and the air regulator 196 can provide a return path to the air supply 186, and can collectively regulate the air flow from the locking system to the air supply 186 when the solenoid valve 194 has been closed by the PTO switch 190.

In operation, the control system 184 can control the flow of air through the air line system 174. For example, actuation of the PTO switch 190 can open the solenoid valve 194, which can permit air to flow from the air supply 186, through the safety valve 188, through the inlet conduit 206, through the solenoid valve 194, through the pilot valve 198 and to the primary line 202. When the solenoid valve 194 is open, the pilot valve 198 can permit one-way air flow into the primary line 202 from the inlet line 206 and can prevent one-way air flow into the outlet line 204 from the primary line 202. The end 200 of the primary line can be coupled to a first supplemental line 176a that extends to the first locking device 120a and to a second supplemental line 176b that extends to the second locking device 120b. For example, the first supplemental line 176a and the second supplemental line 176b can be coupled together at a union 200 at the end of the primary line 202. Accordingly, actuation of the PTO switch 190 can provide air from the air supply 186 to the air chambers 170 of the locking devices 120a, 120b of the locking system.

When the solenoid valve 194 is open, air can flow into the air chambers 170 of the locking devices 120, which can pivot the hooks 150 from the unlocked orientation to the locked orientation. Moreover, the air pressure in the locking system can lock the locking devices 120 in the locked orientation. As a result, while the solenoid valve 194 remains open, the locking devices 120 remain locked.

In various instances, when the PTO switch 190 is switched to the second position to close the solenoid valve 194, air can return to the air supply 186. For example, air can be configured to flow through the supplemental lines 176a, 176b, through the union 200 to the primary line 202, through the primary line 202, through the pilot valve 198 to the outlet line 204, through the air regulator 196, and through the safety valve 188 to the supply tank 186. When the solenoid valve 194 is closed, the pilot valve 198 can permit one-way air flow into the outlet line 204 from the primary line 202 and can prevent one-way air flow into the primary line 202 from the inlet line 206.

The reader will appreciate that though the vehicle 100 shown in FIGS. 1 and 2 is a semi-trailer truck, the locking system and devices disclosed herein can be utilized in connection with alternative motor vehicles, such as pickup trucks, cars, sport utility vehicles, vans, motorcycles, and/or buses, for example. Additionally or alternately, the locking system and devices disclosed herein can be utilized in connection with alternative vehicles, such as trains and/or watercrafts, for example.

While the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A pneumatic locking system for securing a container to a chassis, wherein the pneumatic locking system comprises:
   a frame;
   a first hook, wherein the first hook is pivotable between a first unlocked orientation and a first locked orientation relative to the frame;
   a second hook, wherein the second hook is pivotable between a second unlocked orientation and a second locked orientation relative to the frame;
   a first air chamber intermediate the first hook and the frame, wherein inflation of the first air chamber causes the first hook to pivot from the first unlocked orientation to the first locked orientation, and wherein a gravitational force acting on the first hook causes the first hook to pivot to the first unlocked position; and
   a second air chamber intermediate the second hook and the frame, wherein inflation of the second air chamber causes the second hook to pivot from the second unlocked orientation to the second locked orientation, and wherein a gravitational force acting on the second hook causes the second hook to pivot to the second unlocked position;
   wherein the first and second air chambers are formed of an elastic material.

2. The pneumatic locking system of claim 1, further comprising:
   a fluid line;
   a first fitting fluidically coupled to the fluid line, the first air chamber, and an outlet; and
   a second fitting fluidically coupled to the outlet and the second air chamber.

3. The pneumatic locking system of claim 2, wherein an air supply of the chassis is fluidically coupled to the fluid line.

4. The pneumatic locking system of claim 1, wherein the first hook is configured to move toward a vertical axis when the first hook moves from the first unlocked orientation to the first locked orientation, and wherein the center of mass of the first hook is on a first side of the vertical axis when the first hook is in the first unlocked orientation and the first locked orientation.

5. The pneumatic locking system of claim 1, further comprising a shaft secured to the frame, wherein the first hook and the second hook are configured to pivot independently about the shaft.

6. The pneumatic locking system of claim 1, wherein the frame further comprises:

a first cutout structured and dimensioned to receive a portion of the first hook; and a second cutout structured and dimensioned to receive a portion of the second hook.

7. The pneumatic locking system of claim 1, wherein the first hook and the second hook each comprise an L-shaped hook.

8. The pneumatic locking system of claim 1, wherein the first air chamber and the second air chamber are comprised of rubber.

9. A locking system for securing a container to a chassis, wherein the locking system comprises:
   a frame;
   a hook pivotable between an unlocked orientation and a locked orientation relative to the frame, wherein the hook is configured to move toward a vertical axis when the hook moves from the unlocked orientation to the locked orientation, and wherein the center of mass of the hook is on a first side of the vertical axis when the hook is in the unlocked orientation and the locked orientation; and
   an air chamber formed of an elastic material intermediate the hook and the frame, wherein inflation of the air chamber causes the hook to pivot from the unlocked orientation to the locked orientation;
   wherein a gravitational force acting on the hook causes the hook to pivot to the unlocked orientation.

10. A pneumatic locking system for securing a container to a chassis, wherein the pneumatic locking system comprises:
    a frame;
    a first hook, wherein the first hook is pivotable between a first unlocked orientation and a first locked orientation relative to the frame;
    a second hook, wherein the second hook is pivotable between a second unlocked orientation and a second locked orientation relative to the frame;
    a first air chamber intermediate the first hook and the frame, wherein inflation of the first air chamber causes the first air chamber to expand radially, wherein such radial expansion causes the first hook to pivot from the first unlocked orientation to the first locked orientation; and
    a second air chamber intermediate the second hook and the frame, wherein inflation of the second air chamber causes the second air chamber to expand radially, wherein such radial expansion causes the second hook to pivot from the second unlocked orientation to the second locked orientation;
    wherein the first and second air chambers are formed of an elastic material.

* * * * *